United States Patent [19]

Döge

[11] Patent Number: 4,880,339
[45] Date of Patent: Nov. 14, 1989

[54] DRILL BAR WITH A CUTTER INSERT

[75] Inventor: Ulrich Döge, Düsseldorf-Hellerhof, Fed. Rep. of Germany

[73] Assignee: Koyemann Werkzeuge GmbH, Erkrath, Fed. Rep. of Germany

[21] Appl. No.: 644,122

[22] Filed: Aug. 23, 1984

[30] Foreign Application Priority Data

Mar. 15, 1984 [DE] Fed. Rep. of Germany ... 8407867[U]

[51] Int. Cl.⁴ .......................................... B23B 29/02
[52] U.S. Cl. .................................... 408/161; 408/181; 408/713
[58] Field of Search ............... 408/160, 161, 162, 163, 408/164, 165, 166, 167, 168, 169, 170, 171, 181, 182, 183, 185, 187, 188, 197, 198, 713

[56] References Cited

U.S. PATENT DOCUMENTS

| | | | |
|---|---|---|---|
| 1,062,225 | 5/1913 | Crowley | 408/185 X |
| 1,218,992 | 3/1917 | Ford | 408/171 |
| 1,659,370 | 2/1928 | Magin | 408/183 |
| 2,680,390 | 6/1954 | Chapman . | |
| 2,811,055 | 10/1957 | Zempel | 408/185 |
| 3,124,980 | 3/1964 | Gill et al. | 408/103 |
| 3,688,367 | 9/1972 | Bennett | 29/105 |

FOREIGN PATENT DOCUMENTS 2436501 12/1978 Fed. Rep. of Germany .

Primary Examiner—Steven C. Bishop
Attorney, Agent, or Firm—Michael J. Striker

[57] ABSTRACT

In a drill bar having a transverse slot, in which a cutter assembly having two diametrically oppositely positioned cutters is inserted, the cutter assembly has a housing from which the outer cutting edges of the cutters are outwardly extended. Each cutter is formed of a one-piece made of high-strength material and has an inner cutting edge and an inner and outer inclined wall adjusted to an inclined wall of the tapered tip of the adjustment bolt which is inserted into the recess formed in the housing to adjust the distance between the outer cutting edges of the two cutters in dependence on a hole to be drilled.

4 Claims, 2 Drawing Sheets

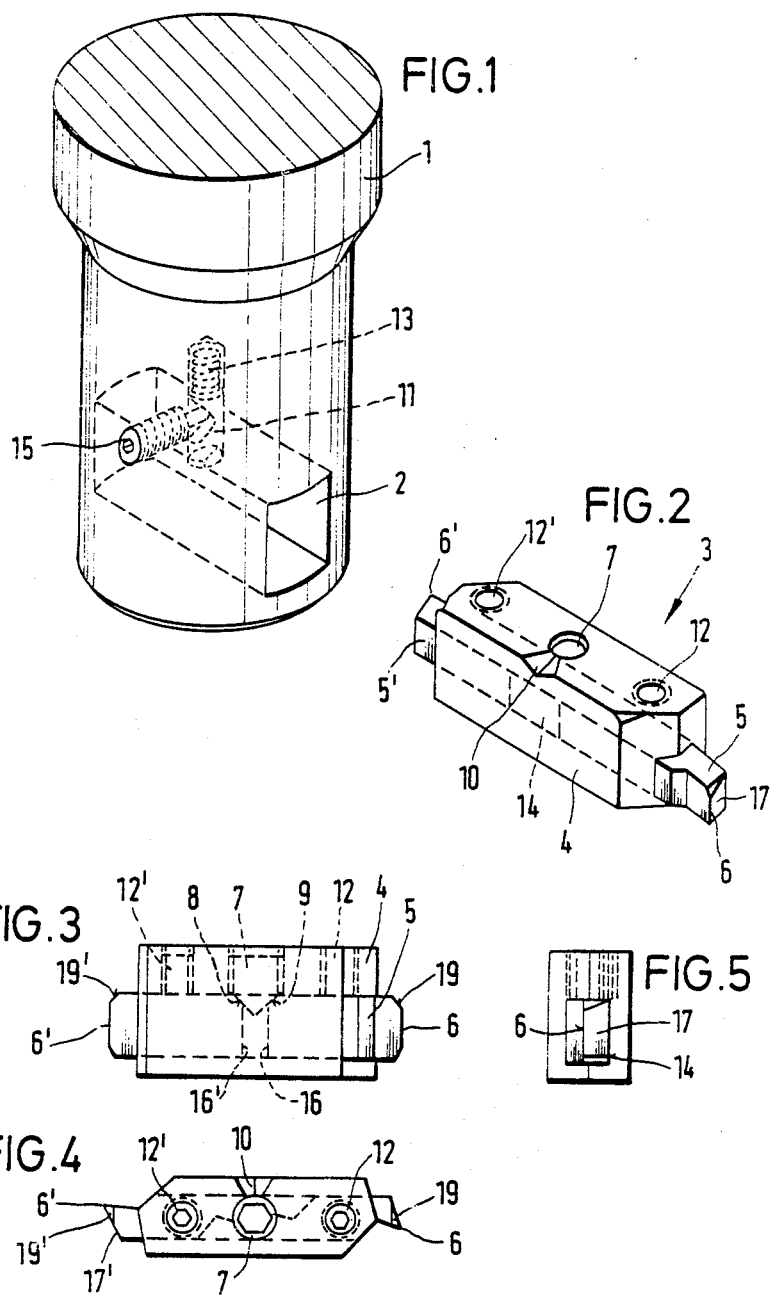

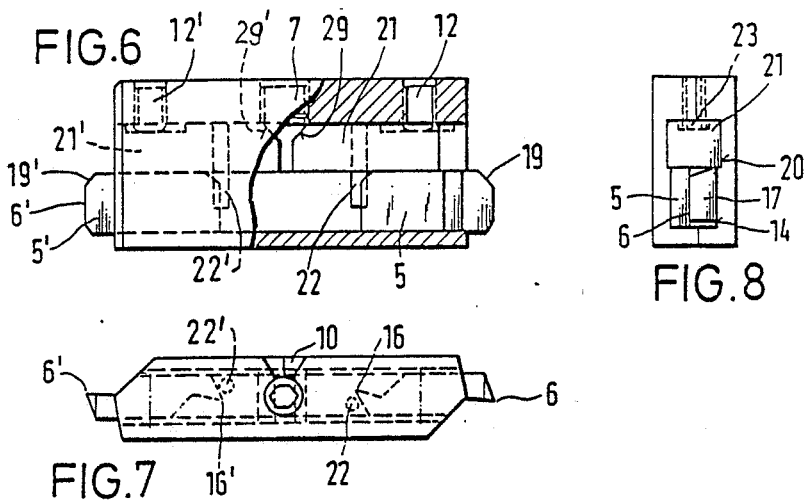
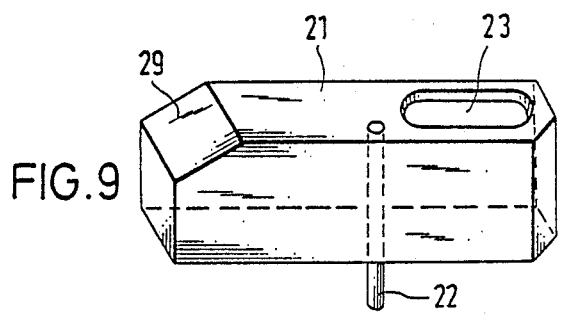
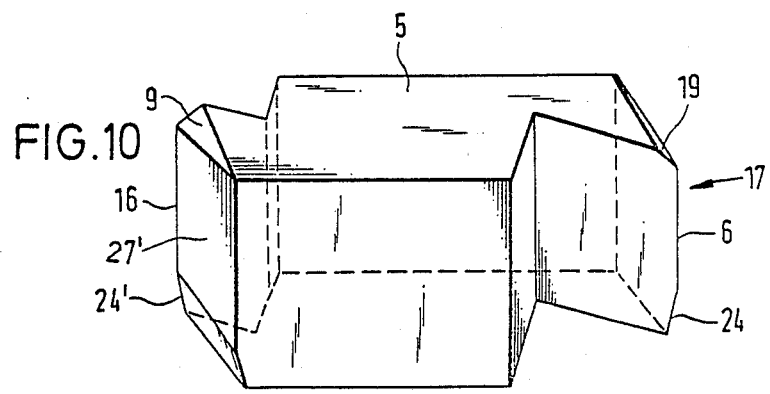

DRILL BAR WITH A CUTTER INSERT

BACKGROUND OF THE INVENTION

The present invention relates to cutting tools in general, and more particularly to such metal cutting tools as drills, reamers, and the like, in which an insert with two opposite blades having cutting edges is employed. Even more specifically, the invention pertains to a cutter insert or assembly which is inserted into a transverse slot provided in a drill bar.

Drill inserts have been known, which include a housing and two diametrically oppositely positioned cutters having cutting edges extended outwardly from the elongated housing at two opposite ends thereof. The housing of the insert is provided in the middle thereof with a prismatic notch, in which the tapered end of an axial adjustment pin for limiting a floating motion of the insert in a radial direction of the drill bar, is more or less engaged, and the cutters inserted into the elongated recess of the housing are adjusted to each other along that elongated recess by means of a central adjustment bolt which has a conical tip with the inclined adjustment surfaces which abut against the respective inner ends of the cutters, positioned within that recess. After the cutters have been adjusted to each other in the elongated recess of the insert housing they are secured in that housing by means of clamping bolts.

The cutting assembly or insert of the type under discussion has been disclosed in German patent DE-PS 24 36 501. The drill bar insert described in this patent is utilized as a fine drill cutter for making holes with narrow allowances, specifically for automatic drills which operate with high speeds.

Each cutter in the known drill bar insert includes a cutter carrier, which is supported in the housing of the insert and is extended outwardly therefrom, and a cutter plate soldered to the cutter carrier. This construction has the disadvantage that various sizes of the cutters must be provided for various ranges of diameters of the holes to be drilled. Such cutters of narrow sizes, however, because of high costs, can not be made as one-piece of high strength material.

Another cutting assembly is disclosed in U.S. Pat. No. 2,680,390. A bar for an adjustable reamer is described in this patent which bar has a pair of blades and a blade holder therefor adapted as a unit to be positioned in the transverse slot in the bar and locking set screws in the side walls of the blades to lock the same against relative movement with the holder. The rear end faces of the cutters form a complementary inclined notch to receive the forward inclined head of a centering pin disposed within the axial bore of the bar behind the cutter blade assembly. The centering pin has a radially reduced shank portion to receive a collar of flexible deformable material between it and the bar to permit floating of the blade assembly but resiliently resist radial displacement thereof in the bar. A pressure pin assembly is disposed within the bore behind the centering pin and is provided with externally accessible adjustment and locking screws adapted to apply axial forces upon the pressure pin to force the centering pin axially forwardly for controlling the position of the centering pin.

SUMMARY OF THE INVENTION

It is an object of the present invention to provide a cutting tool insert which would be relatively inexpensive and in which the cutters would be manufactured as one-piece elements of high strength material.

In the case of drilling bores of relatively small diameters this and other objects of the invention are attained by a drill bar having a transverse slot and comprising a cutter insert inserted in said slot and including a housing formed with an elongated recess, two diametrically oppositely positioned cutters inserted in said recess and having outer ends provided with cutting edges and extended outwardly from said housing, and locking screws securing said cutters in said housing, said housing being formed with a central bore and a notch positioned midway of said recess; and a centering pin adjustable along an axis thereof, and limiting a floating motion of the cutter insert in a radial direction in said transverse slot, said pin having a tapered end engaged in said notch, said cutter insert further including an adjustment bolt received in said central bore and having a tapered tip having tapered edges, said cutters having adjusting inclined walls complementing respective tapered edges of said tip, said tapered edges abutting against the respective inclined walls of said cutters when said adjustment bolt is applied into said central bore to adjust said cutters to each other in said elongated recess, said cutters being each formed of a one-piece and made of high strength material, each of said cutters having an additional cutting edge formed at an inner end of each cutter, positioned within said elongated recess, each of said cutters being formed at the outer end with an inclined adjustment wall.

The drill insert according to the invention has the advantage that it is formed as a conventional boring chisel and therefore its service life can be doubled as compared to that of the known insert positioned in the drill bar. Furthermore, one-piece cutters can be manufactured with the same precision as the cutters with holding plates known in the art. The proposed solution is very effective when the diameters of the holes to be drilled are smaller than 25 mm. The length of the cutter in this case is less than 12 mm.

For the drill bar with a cutter insert suitable for drilling holes of greater diameters, for example exceeding 25 mm the drill bar is proposed here, which has a transverse slot and comprise a cutter insert inserted in said slot and including a housing formed with an elongated recess, two diametrically oppositely positioned cutters inserted in said recess and having inner ends and outer ends provided with cutting edges extended outwardly from said housing, and locking screws securing said cutters in said housing, said housing being formed with a central bore and a notch positioned midway of said recess; and a centering pin adjustable along an axis thereof and limiting a floating motion of the cutter insert in a radial direction in said transverse slot, said pin having a tapered end engaged in said notch, said cutter insert further including an adjustment bolt received in said central bore and having a tapered tip having tapered edges, each of the cutters being formed of a one-piece and made of high strength material, each of said cutters having an additional cutting edge formed at the inner end of each cutter, positioned within said elongated recess, said housing being provided with an additional elongated recess formed between a portion of the housing into which said adjustment bolt is inserted and said first mentioned elongated recess, said additional recess being wider than said first mentioned elongated recess; and two sliding blocks positioned in said additional recess, said sliding blocks each having an inner end and an outer end and being formed with an adjusting inclined wall at the inner end, said tapered edges of said tip abutting against the respective inclined walls of said sliding blocks when said adjustment bolt is applied into said central bore to adjust said cutters relative to each other in said first mentioned elongated recess, each of said sliding blocks being provided with a stop extending into said first mentioned recess and cooperating with the respective inner end of the respective cutter, each of said cutters being formed at the outer end with an additional adjusting inclined wall.

The first mentioned adjusting inclined walls and the additional adjusting inclined walls may extend substantially perpendicular to the inner cutting edge and the outer cutting edge of the respective cutter. The cutters of the first embodiment of the drill bar can be utilized in the second embodiment of the drill bar.

Due to the provision of the sliding blocks in the drill bar cutter insert and because of the increase of the distance between the adjusting inclined walls and the respective stops can the sliding blocks and the cutters be adjusted to greater diameters of the holes to be drilled so that the cutters which have been used for holes of relatively small diameters can be also employed for drilling holes of greater diameters.

The first mentioned recess may be formed below the additional recess, and the clamping bolts may be positioned on said portion of the housing in which said adjustment bolt is inserted. Moreover, the lower recess in which the cutters are positioned does not extend vertically as high as the cutters. In this case each clamping bolt presses against the respective sliding block and through the latter clamp the respective cutter in the first mentioned or lower elongated recess.

Each sliding block may be formed at a side thereof, facing said clamping bolts, with a flat depression into which a respective one of said clamping bolts extends in the direction of adjustment and in which the respective clamping bolt is engaged.

Each stop may be formed by a cylindrical pin.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view of a drill bar provided with a recess for receiving a tool insert;

FIG. 2 is a perspective view of the cutter insert according to a first embodiment of the invention, in which an adjustment bolt acts directly on the cutters;

FIG. 3 is a side view of the cutter insert of FIG. 2;

FIG. 4 is a top plan view of the cutter insert of FIG. 2;

FIG. 5 is a front view of the cutter insert of FIG. 2;

FIG. 6 is a side view of a modified embodiment of the invention, in which the adjustment bolt acts on the sliding blocks;

FIG. 7 is a top plan view of the cutter insert of FIG. 6;

FIG. 8 is a front view of the cutter insert of FIG. 6;

FIG. 9 is a perspective view of the sliding block; and

FIG. 10 is a perspective view of the cutter.

DETAILED DESCRIPTION OF THE PREFERRED EMBODIMENTS

Referring now to the drawings more specifically, reference numeral 1 in FIG. 1 designates a drill bar which has a radially extended recess 2 in which a cutter insert or blade assembly 3 is received so that its floating in that recess is permitted in the known fashion. In order to limit the floating motion of the blade assembly a notch 10 is provided axially centrally in a housing 4 of the blade assembly. A tapered end of a centering pin 11 axially adjustable in the drill bar 1 is engaged in the notch 10. To adjust the position of centering pin 11 a set screw 15 is provided which presses against the adjustment surface of the centering pin, which is under the action of a compression spring 13.

With reference to FIGS. 2 through 5 it will be seen that an elongated recess 14 of rectangular cross section is formed, in which two cutters 5 and 5' are inserted and held. Cutting edges 6, 6' of the cutters extend outwardly from housing 4 at two opposite ends thereof, Cutters 5 and 5' are adjustable one against another by means of a central adjustment bolt 7 which has a tapered tip 8 the inclined surfaces of which rest against adjusting inclined walls 9, 9' formed at the inner ends of cutters 5, 5',respectively. Adjusting inclined walls 9, 9' are provided on the inner end edges of cutters 5, 5' facing the adjustment bolt 7; walls 9, 9' are formed at the respective inner side walls 27, 27' of the cutters as can be readily seen from FIG. 10 illustrating an individual cutter. These inclined walls 9, 9' have each an inclination which is complemental to that of the sloped surfaces of adjustment bolt 7. When the distance between cutting edges 6 and 6' is adjusted by adjustment bolt 7 to a required diameter of the hole to be drilled cutters 5, 5' are secured in housing 4 by clamping screws 12, 12'.

Cutters 5, 5' are provided at the inner ends thereof with inner cutting edges 16, 16' and at their outer ends with adjusting inclined walls 19, 19'. The adjusting inclined walls 19, 19' each forms a triangular surface at the outer end of the respective cutter whereas outer side walls 17, 17' on the outer ends of the cutters as well as the above mentioned inner side walls 27, 27' do not extend normal to the longitudinal axis of housing 4 and thus of the blade assembly 3 but they are inclined to that axis whereby the angles of the outer cutting edges 6, 6' are acute. Each cutter 5, 5' is formed of a high strength, wear-resistant material, for example multilayer hardened metal or cutting ceramics.

For greater diameters of holes to be drilled a blade assembly shown in FIGS. 6 through 8 is more suitable. In this modified embodiment in addition to the elongated recess 14 for receiving cutters 5 and 5' a second longitudinal or axial recess 20 is formed which extends vertically between recess 14 and the upper portion of housing 4, in which adjustment bolt 17 is arranged Recess 20 is somewhat wider than the recess 14. Two sliding blocks 21, 21' are inserted in recess 20 from the outer ends thereof, sliding blocks 21, 21' producing a connection between central adjustment bolt 7 and cutters 5, 5' so as to adjust the distance between the cutting edges 6, 6' of these cutters.

With reference to FIG. 9 it is seen that each sliding block 20, 21 has at its inner end facing the adjustment bolt 7, an adjusting inclined wall 29, 29' which complements to and is in cooperation with the respective inclined surface of conical tip 8 of the adjustment bolt 7. A stop 22, 22' extended outwardly downwardly from the respective sliding block is provided at the side of each block facing the cutters 5, 5'. Stops 22, 22' abut against respective inner ends of cutters 5, 5'. The elongated recess 14, in which cutters 5, 5' are positioned, is narrower than the recess 20 in which sliding blocks 21, 21' are inserted. Clamping bolts 12, 12' which are pressed against sliding blocks 21, 21' also secure cutters 5, 5' in the housing 4.

A recess or depression 23 is formed in the sliding block 21 at the side thereof facing the respective clamping bolt 12' Depression 23 is flat and extends in the direction of adjustment. The lower end of clamping bolt 12 is engaged in this depression 23. A similar depression is formed in sliding block 21' for the second clamping bolt 12'. The advantage of such depression 23 is that sliding blocks 21, 21' can not slide out from the elongated recess 20 and become lost when the clamping bolts for the adjustment of cutters 5, 5' are lost.

FIG. 10 shows a perspective view of cutter 5 with two opposite cutting edges 6 and 16, two opposite adjusting inclined walls 9 and 19 which complement to and come into contact with the respective inclined surfaces of tapered tip 8 of the adjustment bolt 7, depending on whether the side of the cutter having the inclined wall 9 or the inclined wall 19 is in the inserted position within the recess 14, Cutter 5 further has two opposite feed-in sloped surfaces 24, 24' which facilitate the insertion of the cutters into a hole being drilled or tapped.

Side surfaces 17, 27, and 17', 27' of cutters 5, 5' are inclined inwardly from cutting edges 6, 6' and 16, 16', respectively so that each cutting edge is defined by an acute angle. As seen in FIG. 7, stops 22, 22' abut respectively against inner side walls 16, 16' of cutters 5, 5' so that cutting edges 6, 16 or 6', 16' can be accurately adjusted to a required cutting position by means of adjustment bolt 7.

It will be understood that each of the elements described above, or two or more together, may also find a useful application in other types of cutting tool assemblies for drills differing from the types described above.

While the invention has been illustrated and described as limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a drill bar having a transverse slot and comprising a cutter insert in said slot and including a housing formed with a first elongated recess, two diametrically oppositely positioned cutters inserted in said elongated recess and having inner ends and outer ends provided with main cutting edges and extended outwardly from aid housing, and clamping bolts securing said cutters in aid housing, said housing being formed with a central bore and a notch positioned midway of said elongated recess; and a centering pin adjustable along an axis thereof and limiting a floating motion of the cutter insert in a radial direction in said transverse slot, said pin having a tapered end engaged in said notch, said cutter insert further including an adjustment bolt received in said central bore and having a tapered tip having tapered edges, the improvement comprising that said cutters are each formed of a one-piece and made of high strength material, each of said cutters having an additional cutting edge (16, 16') formed at the inner end of each cutter, positioned within said first elongated recess, said housing being provided with an additional elongated recess formed between a portion of the housing into which said adjustment bolt is inserted and said first elongated recess, said additional recess being wider than said first elongated recess; and two sliding blocks positioned in said additional recess, said sliding blocks each having an inner end and outer end and being formed with a first adjusting inclined wall (29, 29') at the inner end, said tapered edges of said tip abutting against the respective said first inclined walls of said sliding blocks when said adjustment bolt is applied into said central bore to adjust said cutters relative to each other in said first elongated recess, each of said sliding blocks being provided with a stop extending into said first recess and cooperating with the respective inner end of the respective cutter, each of said cutters being formed at the outer end with an additional adjusting inclined wall (19, 19') whereby each cutter can be turned by 180° to be positioned in said recess so that said additional cutting edge will be extended outwardly from said housing whereas said additional adjusting inclined wall will abut against a respective stop.

2. The drill bar as defined in claim 1, wherein said first recess is formed below said additional recess and said clamping bolts are positioned in a portion of the housing, in which said adjustment bolt is inserted, above said sliding blocks.

3. The drill bar as defined in claim 2, wherein each sliding block is formed at a side thereof facing said clamping bolts with a flat depression into which a respective one of said clamping bolts extends in a direction of adjustment and in which the respective clamping bolt is engaged.

4. The drill bar as defined in claim 1, wherein each of said stops is a cylindrical pin connected to the respective sliding block.

* * * * *